April 10, 1956     J. A. PERSSON     2,741,689
TUNGSTEN BACK-UP BAR
Filed June 15, 1953
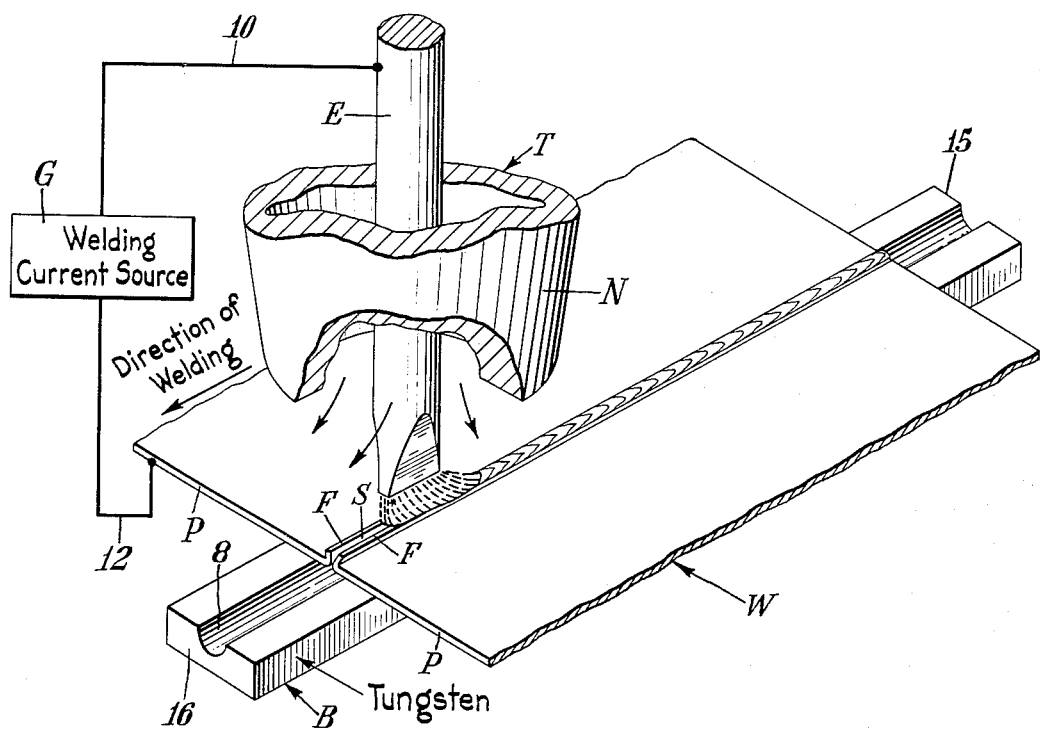
INVENTOR
JOHN A. PERSSON
BY
Richard S. Shreve, Jr.
ATTORNEY

United States Patent Office 2,741,689
Patented Apr. 10, 1956

2,741,689

TUNGSTEN BACK-UP BAR

John A. Persson, Kenmore, N. Y., assignor to Union Carbide and Carbon Corporation, a corporation of New York Application June 15, 1953, Serial No. 361,610

4 Claims. (Cl. 219—10)

This invention relates to welding back-up bars for electric arc welding, of particular advantage in conjunction with gas shielded arc welding of seams in light gage sheet metal at extremely high speed, and constitutes an improvement upon the invention disclosed in my copending application Serial No. 278,439, filed March 25, 1952, for "High Speed Inert Gas Shielded Arc Welding." This application is in part a continuation of my said copending application, the entire disclosure of which, by this reference, is hereby incorporated into this application.

In the art of welding by the use of the electric arc, the striking of the arc to start the weld presents difficulties which disappear once the welding is in operation, and many expedients have been devised to cope with these starting problems. These difficulties are reflected in the resultant weld, in that when a touch-start is employed, the initial portion of the weld presents a non-uniform appearance. The reason for this is that the nature of the fusion changes from the instant the arc is struck until a state of equilibrium is reached. A similar difficulty is encountered at the end of the weld, in that a crater is usually formed when the arc is terminated.

For these reasons it has been proposed to provide at the respective ends of the seam, starting and run-off tabs of the same metal as the workpiece. The arc is struck on the starting tab, where the transient starting effect is exhausted, and the non-uniform appearance on the weld proper is avoided. The arc is continued beyond the end of the weld proper, and the crater resulting from extinguishing the arc is formed in the run-off plate and not in the weld proper. However, these starting and run-off tabs generally become welded to the workpiece, and their removal, for example by sawing, is time consuming. Furthermore, the use of new tabs for subsequent welds contributes to making the cost prohibitive. These plates become increasingly more difficult to apply and costly to use as the thickness of the workpiece increases.

Apart from the starting and stopping problems, weld penetration to the root of the joint without proper backing tends to form metal beads along the underside of the workpiece below the seam. For this reason it is common practice to use a metal of high thermal conductivity for backing the underside of arc welds. If extended on each end for starting and run-off purposes, these back-up bars would be subject to the same defects as the tabs described above.

Carbon or graphite has also been proposed for backing a seam, but any advantages thereof where extensions on each end would be used to start and terminate an arc would be offset by carbon pick-up at each point. Carborundum and aloxite have also been proposed for back-up purposes, but carborundrum would be extremely difficult to form into a suitable shape due to its composition, and aloxite would not support the starting arc.

Objects of the invention are to eliminate the difficulties referred to above, to facilitate the starting and stopping of the welding operation, and otherwise improve weld back-up provisions.

I have found that by using a refractory metal such as tungsten, extending the length of and beyond the ends of the seam, that the arc travel may be started and finished on the extended portions and the seam is satisfactorily chilled and supported.

In the drawings, the single figure is a fragmentary perspective view of a welding set-up illustrating the invention.

In the form of the invention shown in the drawing, the sheet metal parts P, P of the work W are preferably flanged at F and positioned on a weld back-up bar B having a slight groove 8, the abutting edges of the plates forming a seam S above the groove. The backup-up bar B is composed of a refractory metal consisting essentially of tungsten.

A gas shielded arc welding torch T holds refractory metal electrode E consisting essentially of tungsten, preferably with an emissive additive such as thoria, zirconia or lime, and is mounted in arc welding position with respect to the seam S and is connected to a welding current source such as a generator G by leads 10 and 12, so that welding is accomplished, preferably by a direct current straight polarity arc. The torch T includes a nozzle N which directs an annular stream consisting essentially of inert monatomic gas such as argon or helium along the electrode E to shield the arc.

The back-up bar B has a projecting front end 15 which extends forwardly ahead of the work W, and the arc is struck between the electrode E and this refractory front end 15. This avoids the non-uniform appearance of the weld at the beginning of the seam, which is otherwise produced when the arc is struck directly on the work W. The starting arc, electrode E and front end 15 are all shielded by the inert gas from the nozzle N, which prevents damage to the electrode E and the end 15 by the starting arc.

After the arc is struck between the electrode and the refractory end 15, the torch T with its electrode E and nozzle N is moved relatively to the work W and the back-up bar B, to advance the gas shielded arc onto the work W and along the seam S to effect the weld. The back-up bar B has a refractory rear end 16, and the arc travel is continued beyond the work, to run off the arc onto the refractory rear end 16, where the arc is extinguished while still shielded along with the electrode E and the refractory end 16, by the inert gas from the nozzle N. This avoids the terminal crater frequently formed when the arc is extinguished while still on the work. The refractory nature of the end 16, together with the continued flow of the shielding gas, prevent damage to the end 16 and the electrode E when the arc is extinguished thereon.

I claim:

1. Method of arc welding which comprises supporting the work on a back-up bar of a refractory metal extending beyond the work at the front and rear ends thereof, striking an arc between an electrode and the projecting front end of said refractory bar ahead of the work, relatively moving the arc and the work along the seam above said refractory bar to effect the weld and continuing the arc travel beyond the work onto the projecting rear end of said refractory bar before the arc is extinguished.

2. Method of inert gas shielded arc welding which comprises supporting the work on a back-up bar of a refractory metal extending beyond the work at the front and rear ends thereof, striking an arc between an electrode and the projecting front end of said refractory back-up bar ahead of the work, passing an annular stream containing essentially inert monatomic gas along the electrode to shield the arc between said electrode and said refractory back-up bar, and relatively moving said electrode and shielding stream with respect to said refractory back-up bar to advance the arc onto the work and along the seam to effect the weld.

3. Method of inert gas shielded arc welding which comprises supporting the work on a back-up bar of a refractory metal extending beyond the work at the front and rear ends thereof, striking an arc between an electrode consisting essentially of tungsten and the front end of said back-up bar ahead of the work directing an annular stream consisting essentially of inert monatomic gas along the electrode to shield the arc between the front end of said back-up bar and the electrode, relatively moving said electrode and said gas stream with respect to the work along a seam to effect the weld, and continuing the stream and the arc travel beyond the work onto the rear end of said refractory bar to shield the arc as it is extinguished.

4. Method of inert gas shielded arc welding which comprises supporting the work on a back-up bar constructed of a refractory metal consisting essentially of tungsten, said bar having a front end adapted to project beyond the work, striking an arc between an electrode and said refractory bar ahead of the work, and relatively moving the arc and the work along the seam above said bar to effect the weld, said bar having a rear end adapted to project beyond the work and continuing the arc travel beyond the work so that the arc may be run off the work onto the rear end of said refractory bar before the arc is extinguished.

References Cited in the file of this patent

UNITED STATES PATENTS

| | | |
|---|---|---|
| 473,003 | Howard | Apr. 19, 1892 |
| 1,512,787 | Morton | Oct. 21, 1924 |
| 2,405,542 | Wassell | Aug. 6, 1946 |
| 2,441,176 | Wilson et al. | May 11, 1948 |